United States Patent
Pineau

(10) Patent No.: US 7,206,806 B2
(45) Date of Patent: Apr. 17, 2007

(54) METHOD AND SYSTEM FOR REMOTE UTILIZING A MOBILE DEVICE TO SHARE DATA OBJECTS

(76) Inventor: Richard A. Pineau, 395 Chestnut St., No. Andover, MA (US) 01845

( * ) Notice: Subject to any disclaimer, the term of this patent is extended or adjusted under 35 U.S.C. 154(b) by 991 days.

(21) Appl. No.: 09/870,536

(22) Filed: May 30, 2001

(65) Prior Publication Data

US 2002/0184318 A1 Dec. 5, 2002

(51) Int. Cl.
*H04M 11/10* (2006.01)
(52) U.S. Cl. .................. 709/203; 709/227; 455/412; 455/422; 348/14.02
(58) Field of Classification Search ................ 709/224, 709/226, 228, 232, 203, 227; 455/412, 414, 455/411, 419, 422, 517; 370/281, 509; 348/14.02
See application file for complete search history.

(56) References Cited

U.S. PATENT DOCUMENTS

| | | | | |
|---|---|---|---|---|
| 5,689,502 | A * | 11/1997 | Scott ........................... | 370/281 |
| 5,694,484 | A | 12/1997 | Cottrell et al. .............. | 382/167 |
| 6,085,084 | A * | 7/2000 | Christmas ................... | 455/411 |
| 6,128,415 | A | 10/2000 | Hultgren, III et al. ...... | 382/276 |
| 6,133,985 | A | 10/2000 | Garfinkle et al. ............ | 355/40 |
| 6,233,608 | B1 | 5/2001 | Laursen et al. ............. | 709/217 |
| 6,292,657 | B1 * | 9/2001 | Laursen et al. ............. | 455/411 |
| 6,327,610 | B2 * | 12/2001 | Uchida et al. .............. | 709/206 |
| 6,388,997 | B1 * | 5/2002 | Scott .......................... | 370/280 |
| 6,438,369 | B1 * | 8/2002 | Huang et al. ............... | 455/417 |
| 6,535,728 | B1 * | 3/2003 | Perfit et al. ................. | 455/410 |
| 6,542,739 | B1 * | 4/2003 | Garner ........................ | 455/427 |
| 6,636,721 | B2 * | 10/2003 | Threadgill et al. ......... | 455/12.1 |
| 6,650,901 | B1 * | 11/2003 | Schuster et al. ........... | 455/456.1 |
| 6,694,133 | B1 * | 2/2004 | Tobita et al. .............. | 455/414.1 |

FOREIGN PATENT DOCUMENTS

EP 98/58332 12/1998

OTHER PUBLICATIONS

U.S. Appl. No. 09/870,561, filed May 30, 2001.
U.S. Appl. No. 09/870,537, filed May 30, 2001.
"From Smart Card To Video Goggles: A Global Guide To Nifty Devices", Aug. 3, 2000, p. 1-8, www.WSJ.com.
"Send Images To I-Mode Phones", May 7, 2001, pp. 1-3,MobileMediaJapan.com, http://www.MobileMedia.Japan.com/newsdaek/docoal.
"Can I Use Cookies When Developing I-Mode-Compatible Sites", I-Mode Technical FAQ, http://www.mobilemediajapan.com/imodefaq/q22.

(Continued)

*Primary Examiner*—Khanh Dinh

(57) ABSTRACT

Systems and methods are disclosed that provide users of mobile handheld digital devices the opportunity to share large data objects, such as images or digital audio files, with multiple users and the opportunity to upload a data object from a data object source and transmit the uploaded data object to a remote server in order to make the uploaded data object available for sharing with multiple users. The shared data objects can be accessible via a link to the object or by means of reduced size versions of the shared data objects.

16 Claims, 13 Drawing Sheets

OTHER PUBLICATIONS

The LightSurf Technology Platform, 2001, pp. 1-5, www.lightsurf.com/tech/index.html.
"imode"-Eurotechnology's Short Guide To DoCoMo's Wireless Internet System, pp. 1-3, Oct. 14, 2000, www.eurotechnology.com.
"Ericsson Unveils First GSM Mobile Camera", Mar. 22, 2001, http://www.ericsson.com/infocenter/news/gsmcommunicam.html.
"Wireless Web Special Report", F. Harvey, K. J. Bannan, pp. 40-49, Oct. 2000, Scientific American.
Yahoo Inc.: "Yahoo Photos Photos Help", Yahoo Photos Help, Online!Apr. 13, 2001. XP002247402.
Shen K H W et al: "WAP mail service and short message service for mobile CRM 'customer relationship management!'", Multimedia Software Engineering, 2000. Proceedings. International Symposium on Taipei, Taiwan, Dec. 11-13, 2000, Los Alamitos, CA, USA, IEE, Comput. Soc, US, Dec. 11, 2000, pp. 201-207.

* cited by examiner

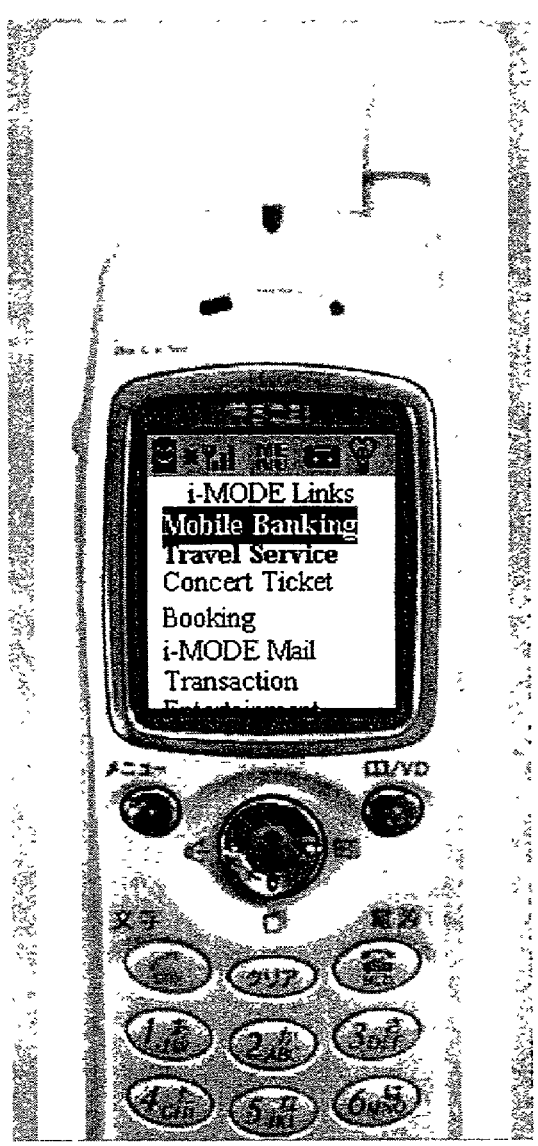
Fig. 3c
Fig. 3d

METHOD AND SYSTEM FOR REMOTE UTILIZING A MOBILE DEVICE TO SHARE DATA OBJECTS

BACKGROUND OF THE INVENTION

1. Field of the Invention

The present invention relates to the use of mobile handheld devices. More specifically, it relates to utilizing mobile handheld devices to share data objects.

2. Background Description

As the infrastructure for mobile access to the World Wide Web grows, the number of possible applications also proliferates. Acceptance of the mobile world wide Web also continues to grow, specifically in Japan and Europe. By September 2000, the NTT DoCoMo I-mode service had over 15 million users. I-mode services, by September 2000, included banking, trade (credit card of, securities, insurance), travel services, ticket services (concerts, events, etc.), restaurant information, e-mail, news, games, and animated cartoons. The vision of personal services and e-commerce accessible via a handheld device is an exciting one.

However, some of the characteristics of mobile handheld devices such as smart phones, smart communicators, and mobile PDAs, present hardware challenges to the development of wireless world wide Web applications. The mobile handheld devices have small memory, low-power CPUs, small displays, restricted colors and fonts, and a restricted input method. Such hardware restrictions have triggered the development of the compact Markup language (compact HTML), the Wireless Mark up language (WML) and the wireless applications protocol (WAP).

The infrastructure in place as of 2000 uses either compact HTML (c-HTML) or the wireless applications protocol (WAP) and its markup language WML. The NTT DoCoMo I-mode service, with 21.7 million subscribers (which constitutes approximately 60% of the world wide wireless internet users), uses c-HTML and a packet switched internet protocol system besides a traditional circuit switched system (PDC—Personal Digital Cellular). (In circuit switched systems, after a connection is made, part of the network is dedicated to that connection. In packet switched networks, the information is divided into packets, sent through the network and reassembled at the receiving end; thus, the entire network is available to all connections.) Compact HTML does not accept JPEG images. In the I-mode service, images must be in GIF format, of up to 256 colors (8 bit color), and of 94 by 72 dot size. In I-mode, the content (that is, the web sites of interest) is provided by service providers using HTTP, the standard web protocol, to a so called I-mode center. The I-mode center converts the HTTP protocol to the reduced protocol accepted by the phones thereby enabling the content to be delivered to the phone.

The other 39% of the wireless internet users use phones that utilize the wireless applications protocol (WAP). As of 2000, WAP enabled phones utilized the existing circuit switched network. The markup language for WAP is WML. Similar to HTML, WML is read and interpreted by a browser (a micro-browser) built into the WAP enabled device. The WAP protocol specification allows only for one graphic format, WBMP, a one (1) bit version of the BMP format. As of 2000, only one WAP browser accepted color images. In WAP enabled phones, when the user, via a micro-browser, requests a URL, the request for the URL is sent to a WAP gateway. The gateway connects to the Internet and serves an interface between the Internet service at a web server and the WAP-enabled phones. Some WAP gateways convert HTML documents into WML. In other cases, the web server containing the service (web pages) of interest provides the WML documents.

Although the bandwidth available for wireless transmission is increasing as the wireless systems migrate to the third and fourth generation, bandwidth is always a scarce commodity. (The bandwidth of 2 G and 2.5 G systems results in long transmission times for large files.) The same hardware and bandwidth restrictions make the sharing of large data objects, such as images, digital audio files, and large documents difficult.

Several solutions have been proposed and implemented in order to enable the handling of large data objects. DoCoMo introduced a unit with a camera, Camesse, that is capable of acquiring a 110 K image and transmitting it to another phone or to a PC (See WSJ.com, "From Smart Card to Video Goggles: A Global Guide to Nifty Devices", Aug. 3, 2000). This camera enables the sharing of images between two parties or, following a many step process, the sharing of images using a PC and the Internet. DoCoAl.com provides a service that allows e-mails created on a PC or Camesse device and containing attached images to provide a link, accessible through a mobile device, to the attached image ("Send images to I-mode phones", MobileMediaJapan.com, http://www.MobileMediaJapan.com/newsdaek/docoal, May 7, 2001). However, the sharing of images between multiple users via mobile handheld devices is not enabled. LightSurf has developed technologies to optimize and speed up the transfer of images from one wireless device to another or to a wired device such as a PC. However, the LightSurf technology does not enable the sharing of images between multiple users. Thus, users are not provided with the opportunity to share large data objects, such as images or digital audio files, with multiple users.

SUMMARY OF THE INVENTION

It is the primary object of this invention to provide users of mobile handheld digital devices the opportunity to share large data objects, such as images or digital audio files, with multiple users.

It is another object of this invention to enable a user of a mobile handheld digital device to upload a data object from a data object source and transmit the uploaded data object to a remote server in order to make the uploaded data object available for sharing with multiple users.

It is also another object of this invention to enable the users of mobile handheld digital devices to share reduced size version of the selected data object with multiple users.

To achieve these and other objects, one aspect of the invention includes a method for sharing data objects utilizing a mobile device, the mobile device having a unique identifier and access to at least one of a plurality of services at a remote server. The method comprises the steps of (a) establishing a linking relationship between the unique identifier and an account at a service from the at least one of many services at the remote server, (b) receiving, at the remote server, a request, from the mobile device having the unique identifier, for access to the service containing the account linked to the unique identifier, the service being accessible at the remote server, (c) transmitting, to the mobile device having the unique identifier, a response to the request, the response providing access to a plurality of entities, the entities comprising a list of data objects and a list of addresses, the entities being associated with the account linked to the unique identifier, (d) receiving, at the remote server, from the mobile device having the unique identifier, a request, the request comprising an indication of a selected data object and an indication of at least one of a plurality of addresses and a request to send the indicated data objects to the indicated at least one of a plurality of addresses, the addresses being selected from the list of addresses, and (e) sending, to the at least one of a plurality of addresses, a transmission providing access to the selected data object.

In another aspect of this invention, the method also includes receiving, at the remote server, from the mobile device having the unique identifier, a data object from a data object source, the data object being added to the list of data objects.

In still another aspect of this invention, the method also includes transmitting to the mobile device having the unique identifier, upon receiving the data object from the data object source, a notification of the status of reception.

In a further aspect of this invention, access to the list of data objects and the selected data object referred to in the above methods includes access to reduced size data objects.

In also another aspect of this invention, the data objects are images; the images are sent to other mobile devices; and, the method also includes processing the selected data object, prior to step (e), to provide optimal perceivable image quality.

Further aspects of this invention are systems to implement the methods and computer readable code that causes the systems to execute the methods.

The method and systems of this invention allow the users of mobile handheld devices to share large data objects. The large data objects can be any large data object such as images, digital audio files, or large documents. In the case of images, digital audio files, or large documents, a reduced size data object can be generated.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIGS. 3A, 3B, 3C, and 3D depict representations of graphical user interfaces for web enabled phones;

DETAILED DESCRIPTION

To enable users of mobile handheld digital devices to share large data objects, such as images or digital audio files, with multiple other users, a system and method for sharing data objects utilizing a mobile device, the mobile device having a unique identifier and access to at least one of a plurality of services at a remote server, are disclosed. A description of an embodiment of the system and the method of this invention is given first. A detailed description of an embodiment of the system and method of this invention utilizing a WA P enabled device is then described.

System and Method

Figure 1:
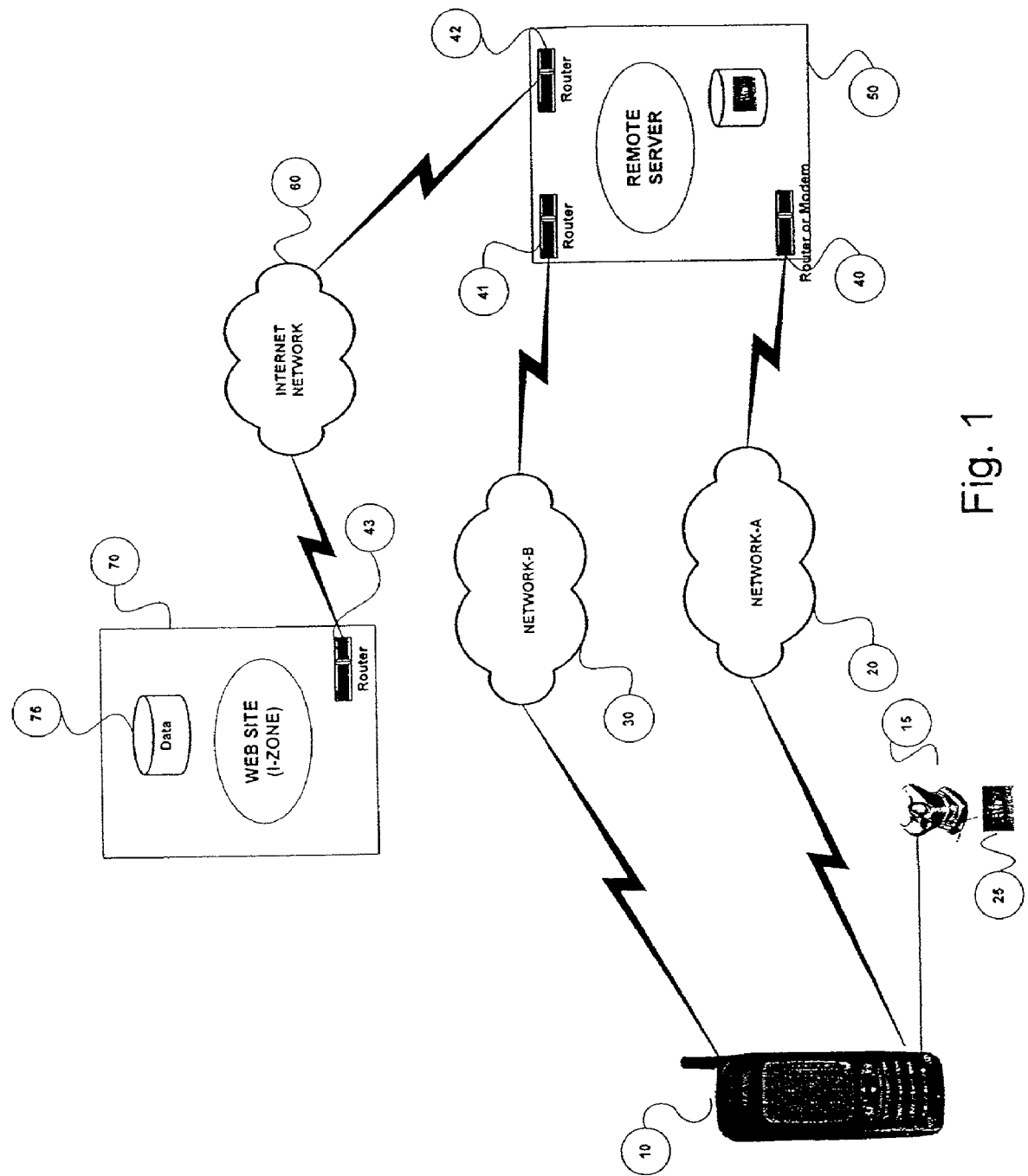
FIG. 1 depicts a graphical representation of an embodiment of the system that enables users of mobile handheld digital devices to share large data objects.
Figure 2A:
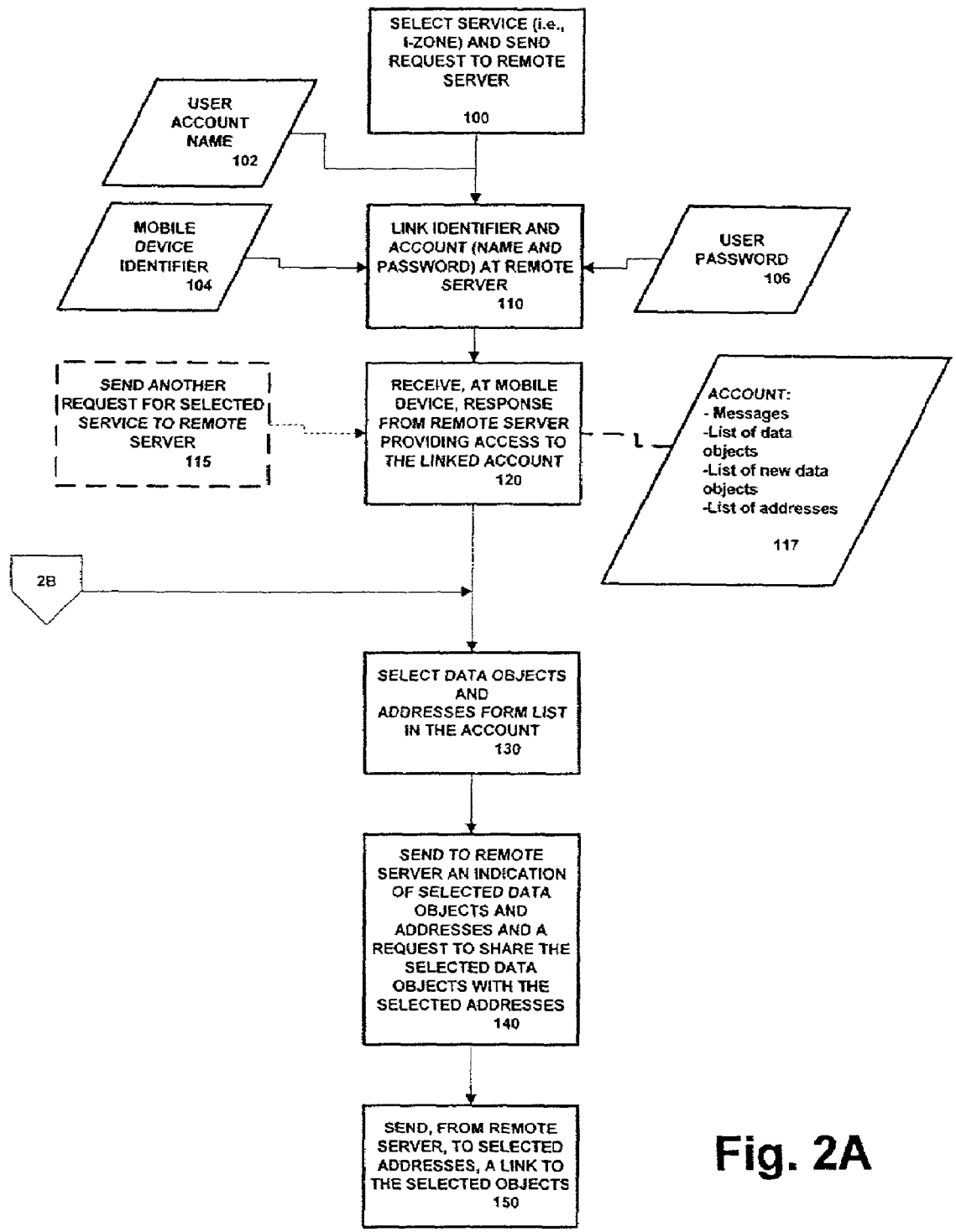
FIGS. 2A, 2B, and 2C depict a flowchart of an embodiment of the method that enables users of mobile handheld digital devices to share large data objects.
Figure 2B:
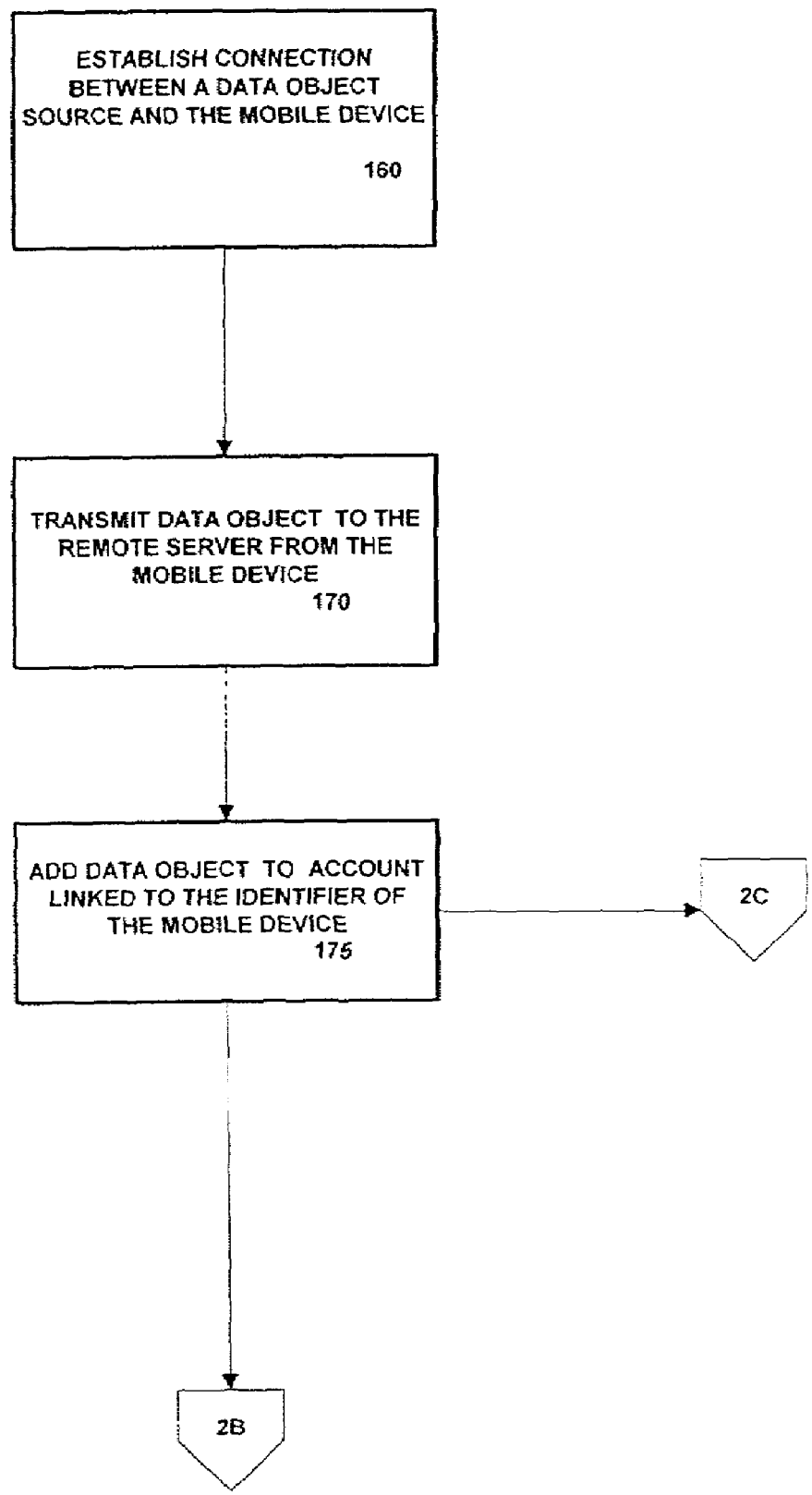
Figure 2C:
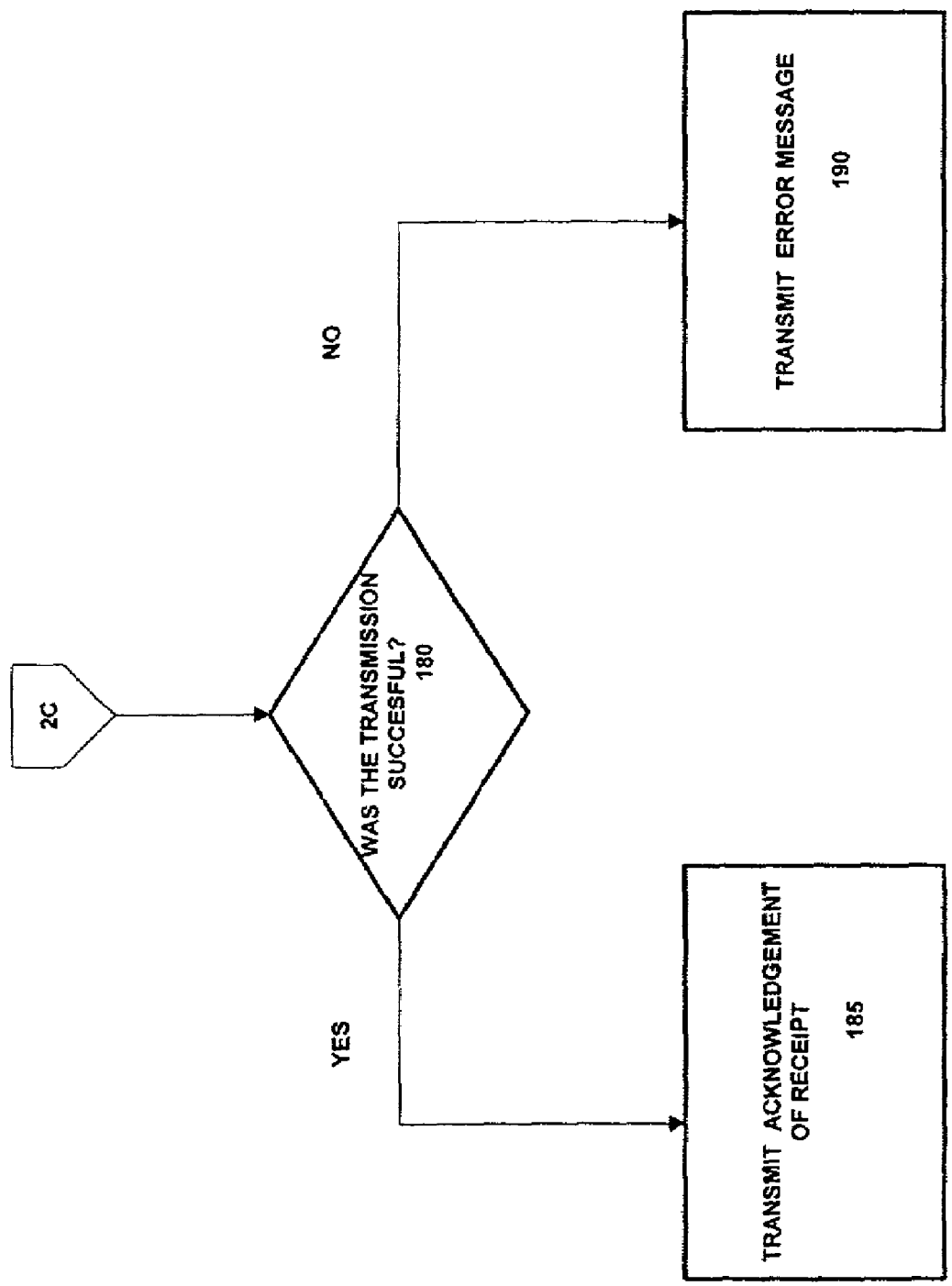

FIG. 1 depicts an embodiment of a system that enables a user of a mobile handheld digital device to share large data objects, such as images or digital audio files, with multiple other users. A mobile handheld device 10 (in this embodiment, a wireless telephone) has access through at least one of several networks to a remote server 50. The mobile handheld device 10 has a unique identifier. In the embodiment in which the mobile handheld device 10 is a wireless telephone, the unique identifier can be the phone number. A device serial number, permanently stored in the device when the device is manufactured, can also be the unique identifier. Two networks are shown in FIG. 1. If the device 10 is a WAP enabled device, only one network, network B 30 for example, is necessary. If the device 10 is an i-mode phone, network A 20 is a circuit switched network and network B 30 is a packet switched network. Both network A 20 and network B 30 can transmit data to the remote server 50. In order to communicate with the remote server 50, both network A 20 and network B 30 could include a gateway server (not shown) and/or modems (also not shown). If the device 10 is a WAP enabled device, network B 30 includes a WAP gateway (not shown) that serves an interface between the Internet service at the remote server and the WAP-enabled device. If the device 10 is an i-mode phone, network A 20, the circuit switched network, when used to send data to remote server 50, needs to include a protocol conversion server (also not shown) to convert from the DoCoMo protocol for messaging to the TCP/IP protocol for mail or messaging; network B 30, the packet switched network, includes an I-mode center server (also not shown) that converts between the HTTP protocol and the reduced protocol accepted by the phone 10. Remote server 50 receives requests and data from the networks 30, 20 and sends responses to the networks 30, 20. The requests, the data, and responses are received and sent via routers 40, 41. The remote server 50 can exchange data through the Internet 60 with other web sites 70. The communication occurs via a router 42.

In utilizing the mobile device 10 to share images, as illustrated in FIGS. 1, 2a, 2b, and 2c, the user of the mobile device 10 selects a service accessible through the remote server 50 and sends a request to the remote server 50 (step 100). The service is contained at another web site 70. The response from the remote server 50 allows the user to enter a user account name 102 for an account in the desired service. The account name 102 can be an existing account name or a new account name. In subsequent exchanges of requests and response, the user enters a password 106. The password 106 can be an existing password or new password. The unique identifier associated with the mobile device 10 is available to the WAP gateway in a WAP enabled device or to the I-mode center server in an I-mode device by means (such as caller ID or data in the HTTP or WAP header) well known to those skilled in the art. For an I-mode device, I-mode sites at the remote server 50 are able to obtain and use a unique ID of the mobile device 10. For a WAP enabled device, WAP gateways can return to the remote server 50 a string in the HTTP header containing the unique identifier. (For example, Phone.com's UP.link gateway returns the user's number and Ericsson's gateway returns a string containing a unique identifier.) It should be apparent to one skilled in the art that once the identifier is accessible to the remote server at the time that the user account (determined by the account name and password) is accessed, a linking relationship between the user account and the identifier can be established (step 110) at the remote server. When the user of the mobile device with the unique identifier sends a request for access to the service containing the account linked to the unique identifier, the service will access the linked account. This request for access to the service could be the initial request of step 100 or a subsequent request (until the linking relationship is a changed). Once the linking relationship has been established, any request for access to the service, originating from the mobile device with the unique identifier 10 and received at the remote server 50 (step 115), will result in access to linked account at the service. At the remote server 50, the request for access to the linked account is transmitted to the web site housing the service 70. The user's account information resides at the data storage device 75 accessible from that web site 70. It should be apparent that the web site 70 could be located at the remote server 50 or could be accessible though the Internet 60. The remote server 50 will send a response to the request and provide access to the user account (the linked account) at the service. The user of the mobile device 10 receives the response from the remote server 50, the user receives access to user's account 117 including messages, a list of data objects, a list of new data objects, a list of addresses.

In order to share data objects, the user of the mobile device 10 selects a data object from the list of data objects or the list of new data objects and addresses from the list of addresses (step 130). The selection of the data object and the addresses is communicated by a request to the remote server 50. Access to the list of data objects can also comprise access to reduced size data objects. Thus, when a user selects a data object from the list of data objects, the user obtains access to the reduced size version of that data object. At the remote server 50, a reduced size version of the selected data object is obtained from the web site 70 containing the service. The reduced size version of the selected data object is converted to a format suitable for transmission to the mobile device 10 at the remote server 50. The reduced size version of the selected data object is transmitted from the remote server 50 to the mobile device 10. The user then verifies the selection and sends to the remote server 50 an indication of the selected data object, an indication of the selected addresses and a request to share the selected data object with the selected addresses (step 140). At the remote server, a link to the selected data object is obtained from the web site 70 containing the service. A response containing a link to the selected data object is sent, from the remote server 50, to the selected addresses (step 150). The user of the mobile device 10 and/or the recipients of the link to the selected data object can print, on a printer connected to the dataport (not shown) of the mobile device 10, the selected data object using the method described in U.S. patent application Ser. No. 09/870, 561 "Method And Apparatus For Printing Remote Images Using A Mobile Device And Printer", filed on this same date, hereby incorporated by reference herein.

The user of the mobile device 10 can upload data objects to the user's account at the service. In order to upload a new data object 25, a connection must be established between the data object source 15 and the dataport (not shown) of the mobile device 10 (step 160). The connection can be a physically wired connection or it can be a wireless connection utilizing an infrared link or a wireless link such as described by the BlueTooth standard. The new data object 25 is then transmitted to the remote server 50 from the mobile device 10 (step 170). Transmission of the new data object 25 is achieved by using the data object source 15 as a data device. The data object source 15 is connected to the dataport of the mobile device 10 and the new data object 25 is sent to the remote server. The data object source must have some of the capabilities of a modem, for example, an IP stack. In this method of operation, the image being transmitted will not be displayed in the display of the mobile device. Also in this method of operation, the mobile device has to switch from being a Web access device to being a data or voice device. Since the remote server 50 can identify the mobile device (for example, in the case of a mobile phone, the remote server 50 can identify the phone number using caller ID), and identifier of the mobile device 10 is linked to the user's account, the new data object will be placed in the user's account (step 175).

After completion of the transmission of the new data object to the remote server, the remote server transmits to the mobile device 10 an indication of the success of the transmission. If the transmission was successful, an acknowledgement of the receipt of the new data object is sent from the remote server 50 (step 185). If the transmission was not successful, an error message is sent from the remote server 50 (step 190). The acknowledgment of message and the error message can be electronic mail or message is posted to the user's account.

Sharing Images Using a Wireless Telephone

Details of one embodiment of the present invention, in which the mobile device 10 is a wireless telephone 200 and the data objects are images, are given below. Since the only open standard for Web enabled wireless telephones is the WAP standard, details will be given below for a WAP system and, when applicable, supplementary details will be given for a DoCoMo I mode system.

Figure 3A:
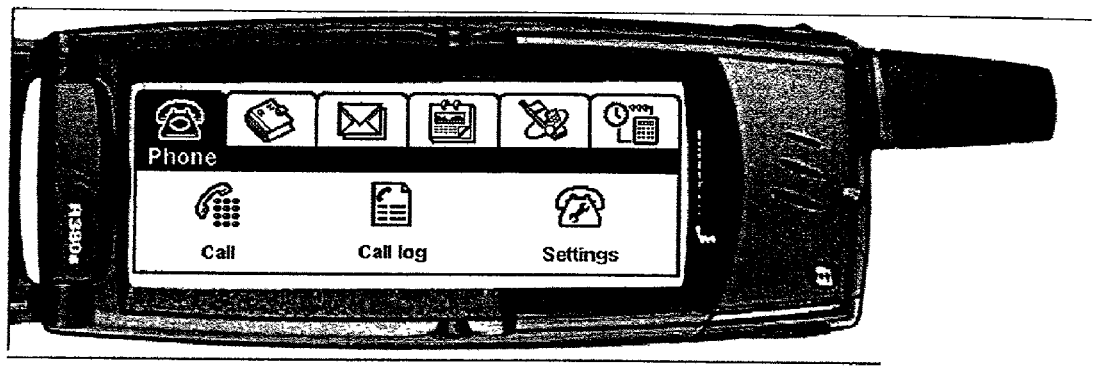
Figure 3B:
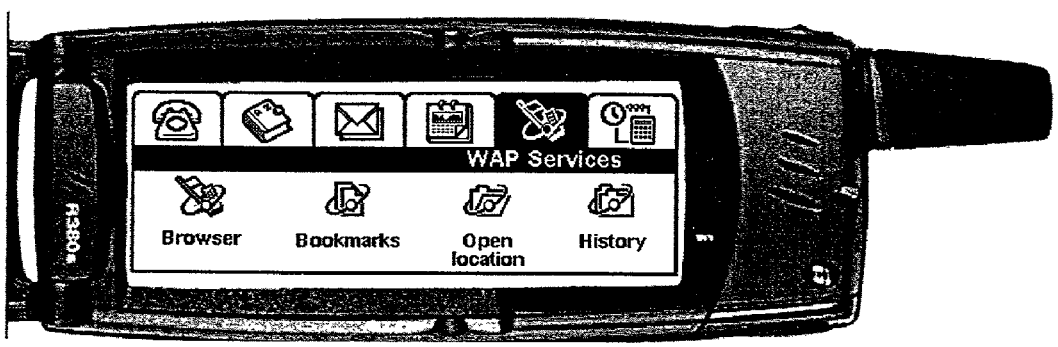
Figure 4:
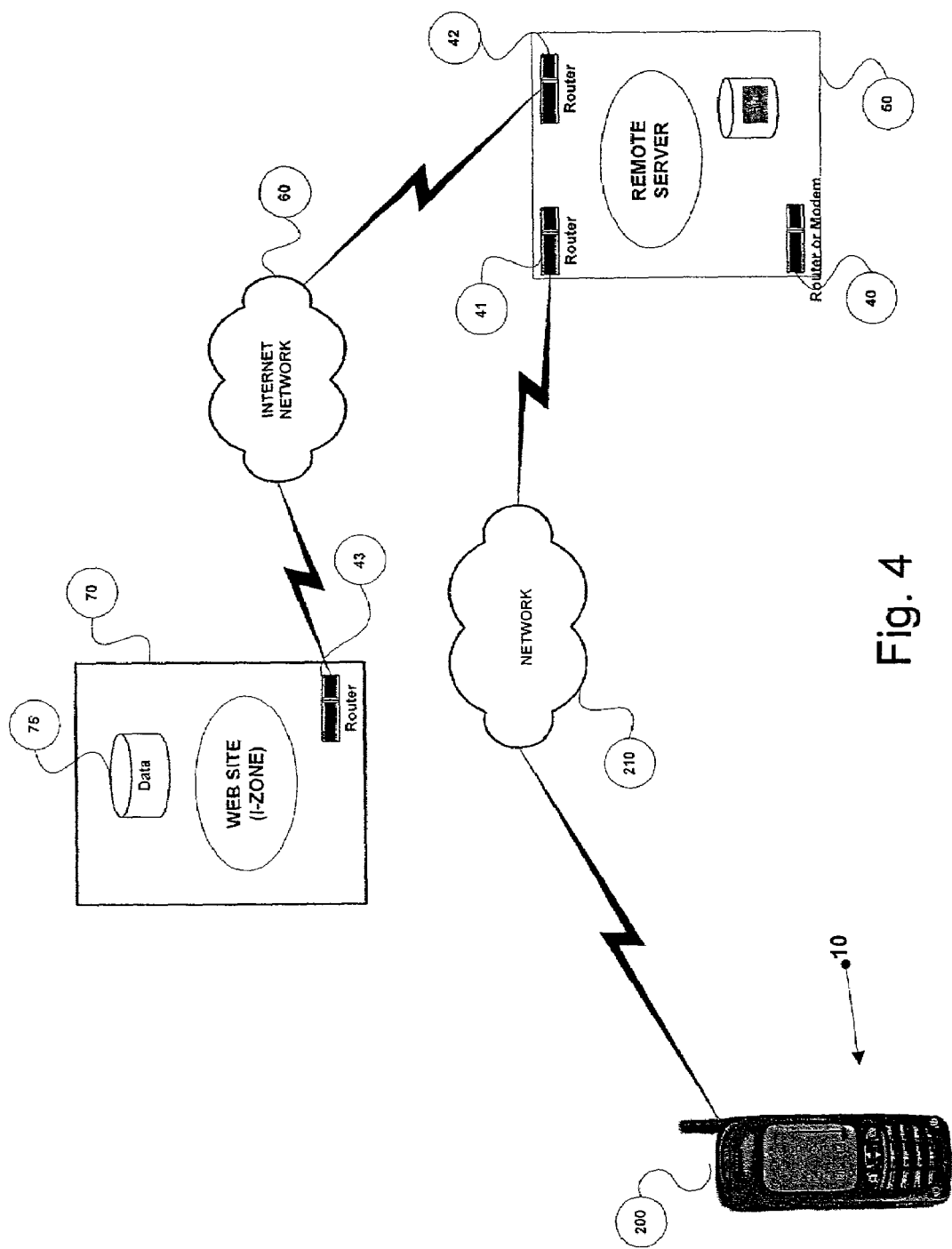
FIG. 4 depicts a graphical representation of an embodiment of the system that enables users of mobile handheld digital devices to share large data objects during the establishing a linking relationship between the unique identifier corresponding to a mobile device and an account at a service at a remote server.
Figure 5A:
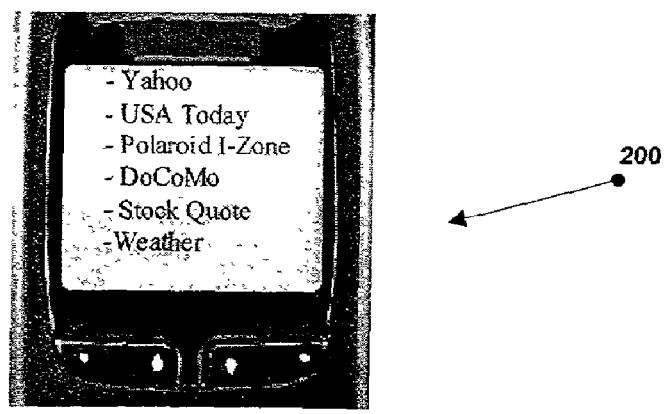
FIGS. 5a, 5b, and 5c are graphical representations of the graphical user interface of the mobile device during the establishment of a linking relationship between the unique identifier corresponding to a mobile device and an account at a service at a remote server.
Figure 5B:
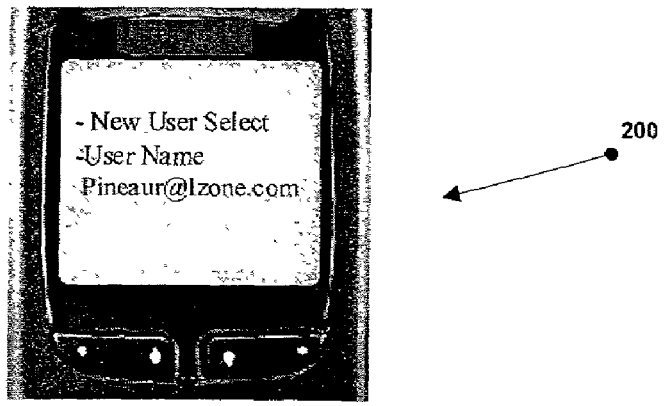
Figure 5C:
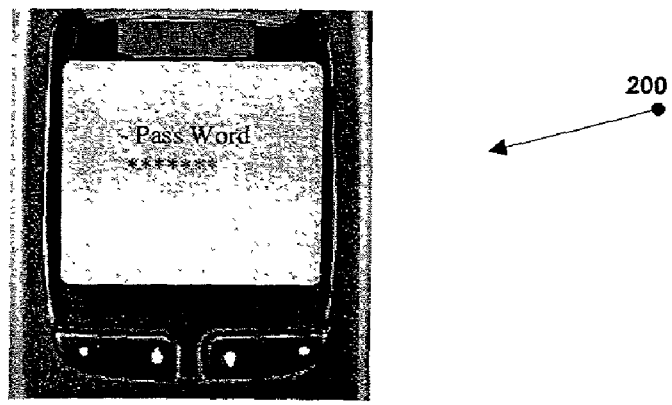

FIG. 3A depicts a representation of the graphical user interfaces for a WAP web enabled phone in the phone mode. FIG. 3B depicts a representation of the graphical user interfaces for a WAP web enabled phone in the web enabled mode. After selecting the WAP services mode as shown in FIG. 3B, the user can then select bookmarks or the micro browser. A graphical representation of the graphical user interface of the wireless phone 200 as it appears when the user selects the bookmarks is shown in FIG. 5A. Referring to FIGS. 4 and 3B, when the user of the wireless phone 200, the phone 200 being in the Web access mode as shown in FIG. 3B, selects bookmarks, a WAP request is transmitted by the phone 200 through the network 210 and is converted by the WAP Gateway (not shown) to a Web request which is transmitted to the remote server 50. The remote server 50 transmits back a response through the WAP Gateway and the network 210 to the micro browser in the phone 200. A graphical representation of the graphical user interface of the wireless phone 200 as it appears after receiving the response is shown in FIG. 5A. The user selects one of the services, Polaroid I-Zone for example, listed in the bookmarks page shown in FIG. 5A. Again, this selection causes a WAP request is transmitted by the phone 200 through the network 210 and is converted by the WAP Gateway (not shown) to a Web request which is transmitted to the remote server 50. The second response from the remote server 50 allows the user to enter a user account name 102 (FIG. 2A) for an account in the desired service. A graphical representation of the graphical user interface of the wireless phone 200 as it appears after receiving the second response is shown in FIG. 5B. Entering a user name, as shown in FIG. 5B, generates a third request which causes as a third response. A graphical representation of the graphical user interface of the wireless phone 200 as it appears after receiving the third response is shown in FIG. 5C. The user enters a password. The password is communicated to the Web site 70 via another request.

FIGS. 3c and 3d depict a representation of the graphical user interface for an I-mode web enabled phone. The I-mode packet switched network is accessed by pressing the I-mode button 320. The description of an embodiment of the method to access an account at a service which is given in the previous paragraph applies to the I-mode web enabled phone when the WAP gateway is replaced by an i-mode center server and references to WAP are replaced by references to I-mode, Strictly speaking I-mode is not a protocol but the specification of the protocol used in the I-mode network (which should be a subset of the Internet Protocol or of HTTP) is not publicly available.

The unique identifier associated with the wireless phone 200 is available to the WAP gateway in a WAP enabled device or to the I-mode center server in an I-mode device by means (such as caller ID) well known to those skilled in the art. For an I-mode device, I-mode sites at the remote server 50 are able to obtain and use a unique ID of the mobile device 10. For a WAP enabled device, WAP gateways can return to the remote server 50 a string in the HTTP header containing the unique identifier. (For example, Phone.com's UP.link gateway returns the user's number and Ericsson's gateway returns a string containing a unique identifier.) It should be apparent to one skilled in the art that once the identifier is accessible to the remote server at the time that the user account (determined by the account name and password) is accessed, a linking relationship between the user account and the identifier can be established (step 110, FIG. 2A) at the remote server. In the described embodiment, the unique identifier and the user's account remains linked until a different user name and password are entered for an account in the service being accessed. In other possible embodiments the linking between the unique identifier and the user's account could be changed every time the WAP enabled mode is entered or could be preset.

For an I-mode phone, I-mode sites at the remote server 50 are able to obtain and use a unique ID of the mobile device 10 (see "Can I use cookies when developing i-mode-compatible sites?", I-mode Technical FAQ, http://www.mobile-mediajapan.com/imodefag/q22). The description given in the previous paragraph applies to the I mode web enabled phone when the WAP gateway is replaced by an I-mode center server and references to WAP are replaced by references to I-mode.

Figure 6:
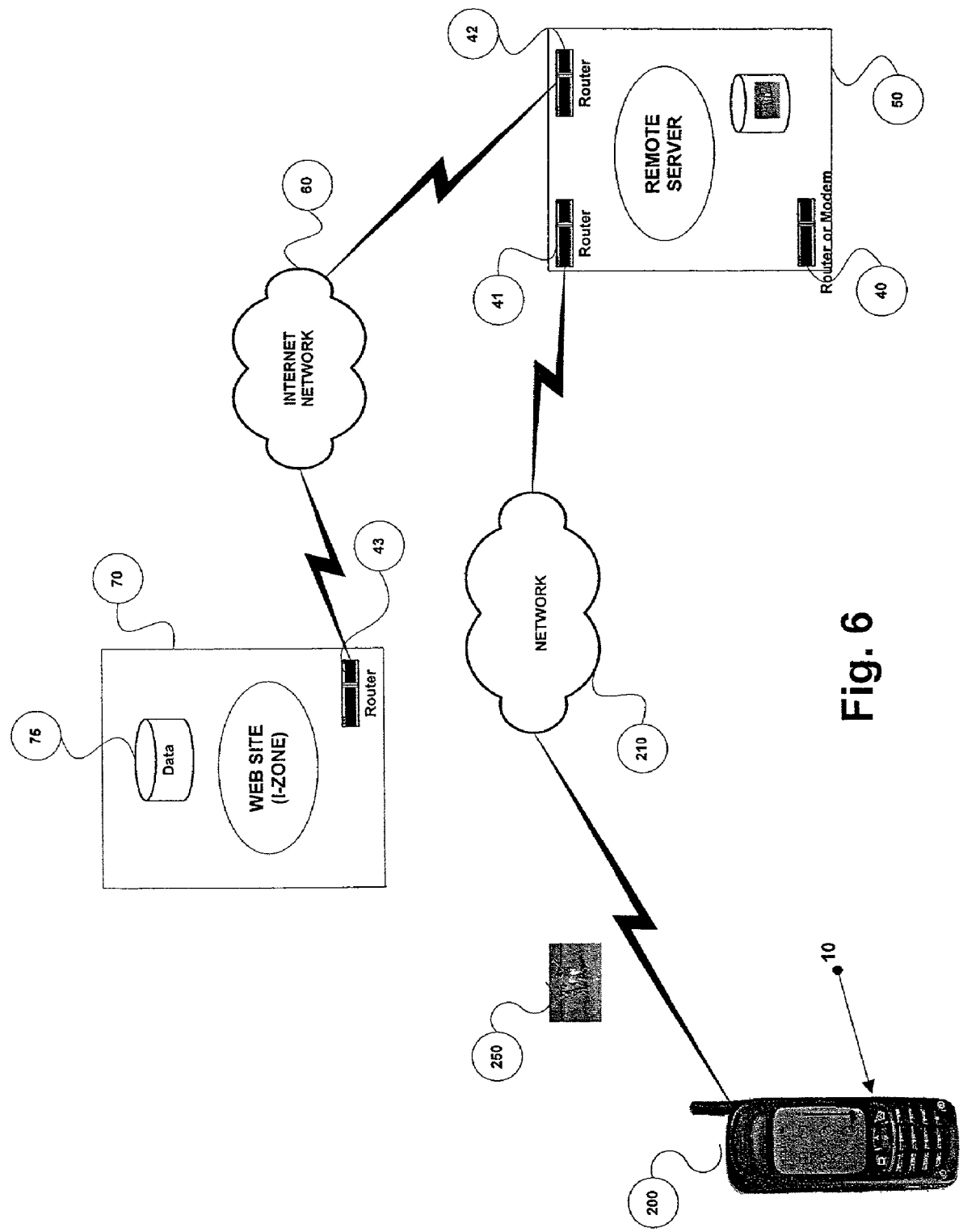
FIG. 6 depicts a graphical representation of an embodiment of the system that enables users of mobile handheld digital devices to share large data objects during the viewing and sharing of the data objects.
Figure 7C:
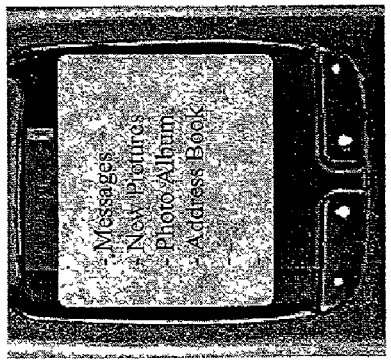
FIGS. 7a, 7b, 7c, 7d, 7e, 7f, and 7g are graphical representations of the graphical user interface of the mobile device during the viewing and sharing of the data objects.
Figure 7B:
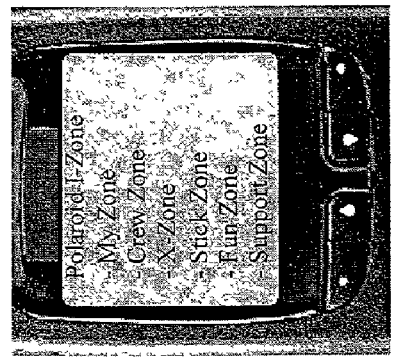
Figure 7D:
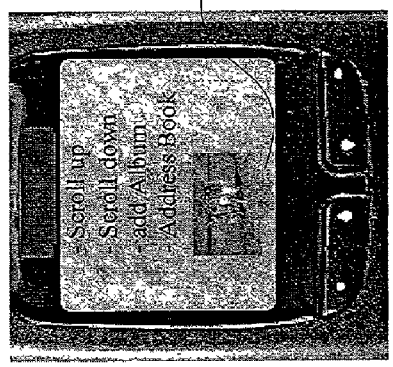
Figure 7A:
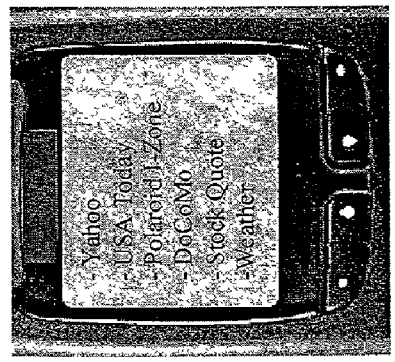
Figure 7G:
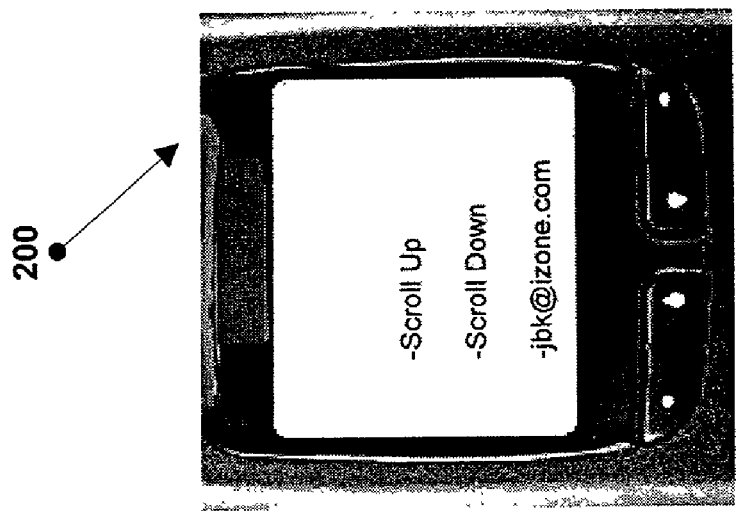
Figure 7F:
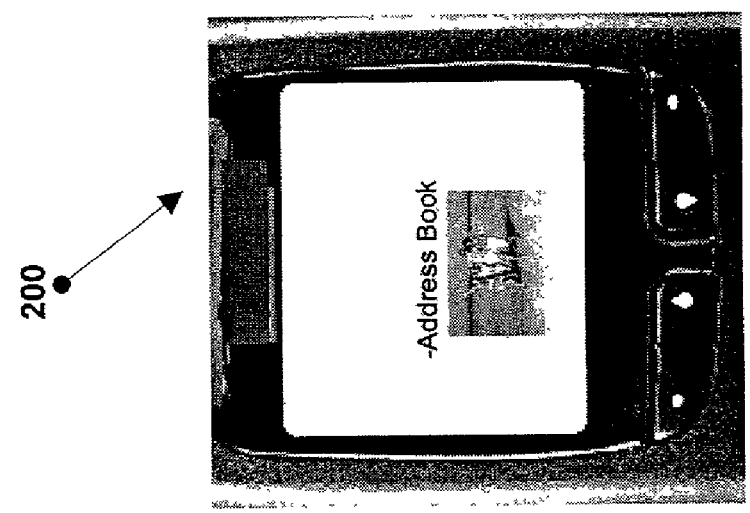
Figure 7E:
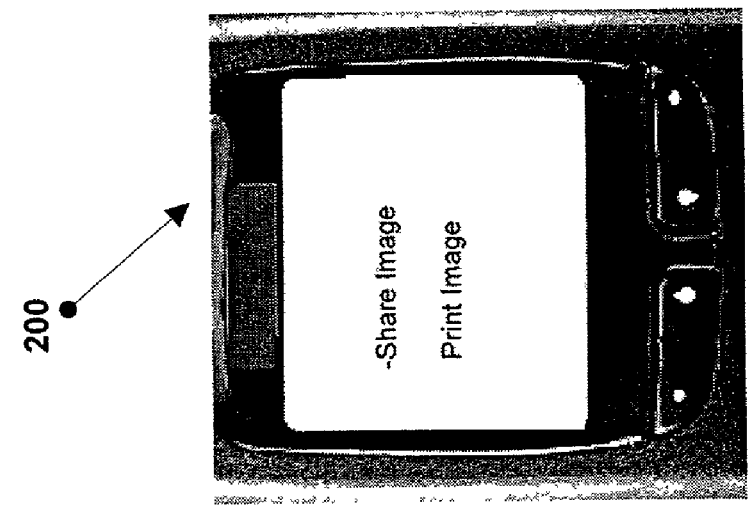

Referring to FIGS. 6 and 7a, the graphical representation of the graphical user interface of the wireless phone 200 after the user of the wireless phone 200 accesses the bookmarks through a sequence of requests and responses is shown in FIG. 7a. When the user selects the service, Polaroid I-Zone for example, that contains the account linked to the unique identifier, a WAP request is transmitted by the phone 200 through the network 210 and is converted by the WAP Gateway (not shown) to a Web request which is transmitted to the remote server 50. Access to the linked account at the web site 70 is obtained by the remote server 50. The remote server 50 transmits back a response through the WAP in Gateway and the network 210 to the micro browser in the phone 200. (The description given above applies to the I mode web enabled phone when the WAP gateway is replaced by an I-mode center server and references to WAP are replaced by references to I-mode.) A graphical representation of the graphical user interface of the wireless phone 200 as it appears after receiving the response is shown in FIG. 7b. As can be seen from FIG. 7b, the response provides access to the user's account, My Zone, since the user's account was already linked to the unique identifier. Selecting the user's account area, My Zone, causes a request to be transmitted to the remote server 50. The response to this request when received at the phone 200 results in a graphical user interface of the wireless phone 200 displaying items accessible at the user's account. The items accessible at the user's account include messages, a list of images (Photo Album), a list of new images (New Pictures), a list of addresses (Address Book), as shown in FIG. 7c. When the user selects New Pictures or Photo Album, a request is transmitted to the remote server 50. At the remote server, a link to the selected data object is obtained from the web site 70 containing the service. The response to the request for New Pictures or Photo Album results in the graphical user interface of the wireless phone 200 similar to that shown in FIG. 7d but without the image 250. As the user scrolls up or down, a request is for a reduced size version of the selected image is sent to the remote server 50. At the remote server 50, the reduced size version of the selected image is obtained from the web site 70 containing the service and converted to a format suitable for transmission to the mobile device 10. For a WAP enabled phone, the reduced size version of the selected image is converted to WBMP format. For an I-mode phone, the reduced size version of the selected image is converted to GIF format. Using the method described in U.S. Pat. No. 5,694,484, (Cottrell et al., System and Method for Automatically Processing Image Data to Provide Images of Optimal Perceptual Quality, issued on Dec. 2, 1997), hereby incorporated by reference herein, in U.S. Pat. No. 6,128,415, (Hultgren et al., Device Profiles for Use in a Digital Image Processing System, issued on Oct. 3, 2000), which is also hereby incorporated by reference herein, and/or in U.S. patent application Ser. No. 09/870,537 "Rendering Images Utilizing Adaptive Error Diffusion", filed on this same date, which is also hereby incorporated by reference herein, an image of optimal perceptual quality rendered for display in a wireless phone 200 of known characteristics can be generated at the remote server 50. The response to the request generated by scrolling results in the graphical user interface of the wireless phone 200 shown in FIG. 7d. The user can then verify the selection and select the image shown in the reduced size version (thumbnail) 250. When the user verifies the selection and selects the image, a request is sent to the remote server 50 resulting in a response producing the graphical user interface of the wireless phone 200 shown in FIG. 7*e*. The user of the wireless phone 200 can then select to share or print the image. The user of the wireless phone 200 can print, on a printer connected to the dataport (not shown) of the wireless phone 200, the selected image using the method described in U.S. patent application Ser. No. 09/870,561 by selecting print from the graphical user interface shown in FIG. 7*e*. If the user selects to share the images, a request is sent to the remote server 50 resulting in a response producing the graphical user interface of the wireless phone 200 shown in FIG. 7*f*. At the remote server, the address list from the user's account is obtained from the web site 70 containing the service. When the user selects Address Book, another request is sent to the remote server 50 resulting in a response producing the graphical user interface of the wireless phone 200 shown in FIG. 7*g*. The user can scroll up or down the address book (or address list) and select an address. Upon selecting an address, a request is sent to the remote server 50. A message is transmitted by the remote server 50 to the selected addresses providing a link to the image selected to be shared. This message could be electronic mail, an SMS service message, or any other form of electronic message. It should be apparent that the above described method can be repeated or easily modified so that the selected image can be shared with multiple recipients and that multiple images can be shared.

Upon receipt of the message providing a link to the image selected to be shared, the recipients can initiate a request and obtain access to the shared image. If the recipients are users of the wireless phones, the recipients can print, on a printer connected to the dataport (not shown) of the wireless phone, the selected image using the method described in U.S. patent application Ser. No. 09/870,561.

Figure 8:
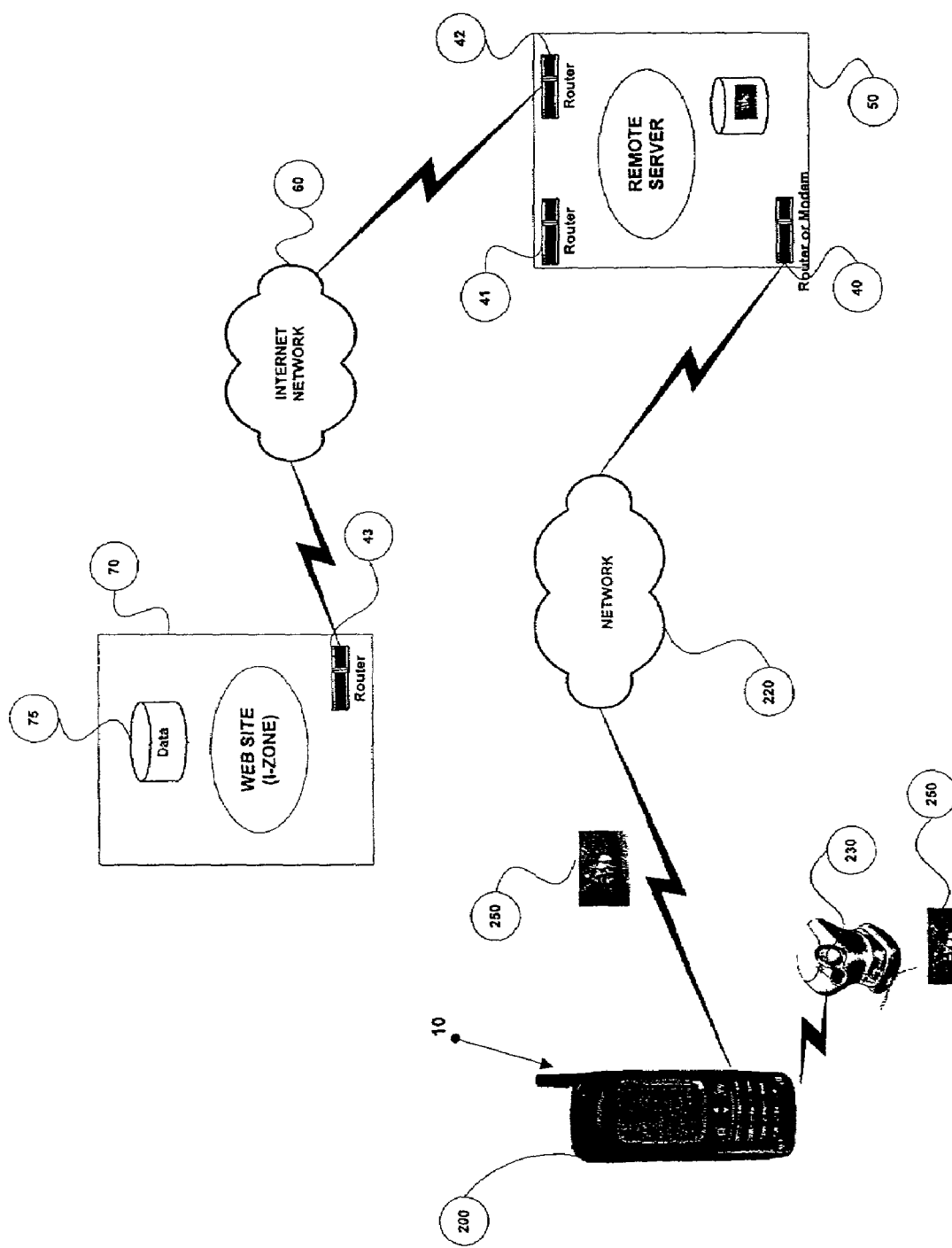
FIG. 8 depicts a graphical representation of an embodiment of the system that enables users of mobile handheld digital devices to share large data objects during the uploading of a data object to the remote server.

As shown in FIG. 8, the user of the wireless phone 200 can upload images to the user's account at the service. In order to upload a new image 250, a connection must be established between the image source 230 and the dataport (not shown) of the wireless phone 200. The image source as shown is a Webster™ scanner, but a variety of other sources, such as a digital camera, a digital camera with a modem, portable scanners, and other portable image sources could be used. (For an I-mode phone, a Camesse system could also be used.) The connection can be a physically wired connection or it can be a wireless connection utilizing an infrared link or a wireless link such as described by the BlueTooth standard. The new image 250 is then transmitted to the remote server 50 from the wireless phone 200. Transmission of the new image 250 is achieved by using the image source 230 as a data device. The image source 230 is connected to the dataport of the wireless phone 200 and the new image 250 is sent to the remote server. The data object source must have some of the capabilities of a modem, for example, an IP stack. In this method of operation, the image being transmitted will not be displayed in the display of the mobile device 10. Also in this method of operation, the mobile device 10 has to switch from being a Web access device to being a data or voice device. In a WAP system, the image is sent by placing the wireless phone 200 in the phone mode as in FIG. 3*a*. In an I-mode system, the phone is switched off from I-mode mode and the transmission occurs through the circuit switched PDC network. Since the remote server 50 can identify the wireless phone (for example, the remote server 50 can identify the phone number using caller ID), and the identifier of the wireless phone 200 is linked to the user's account, the new image will be transmitted from the remote server 50 to the web site 70 where it will be placed in area in the data storage device 75 accessible to the user's account.

It should be understood that if the wireless phone 200 has sufficient memory, the new image 250 from the image source 230 can be transferred to the memory storage of the wireless phone 200. In that case, the wireless phone 200 can be used in the WAP mode to transmit the new image 250 to the remote server 50. (In an I-mode system, in that case, the phone 200 can be placed in the I-mode to transmit the new image 250 to the remote server 50.)

Figure 9A:
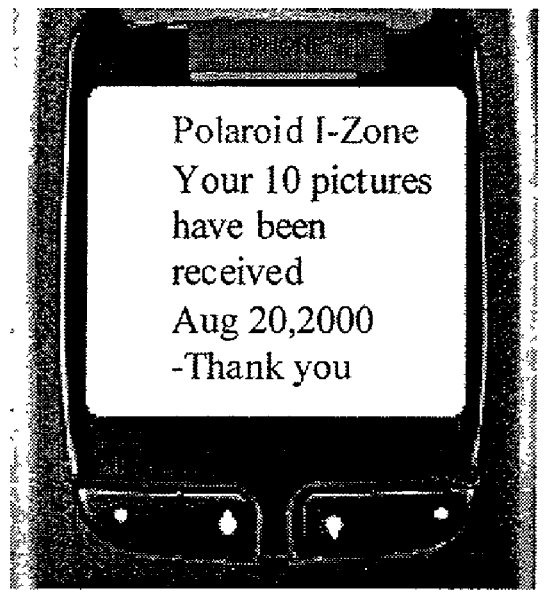
FIGS. 9a and 9b are graphical representations of the graphical user interface of the mobile device during notification of the status of uploading of the data object.
Figure 9B:

The new images are transmitted to web site, I-Zone for example, stored in data storage area 75 and a link to them is included in the user's account. After completion of the transmission of the new image to the remote server 50, the phone 200 is returned to the WAP access mode as shown in FIG. 3*b* (or the I-mode, as shown in FIG. 3*c*). An indication of the success of the transmission is transmitted from the remote server 50 to the wireless phone 200 with the unique identifier. If the transmission was successful, an acknowledgement of the receipt of the new image 250 is sent from the remote server 50. If the transmission was not successful, an error message is sent from the remote server 50. The acknowledgment of message and the error message can be by electronic mail, a message posted to the user's account, an SMS service message, or any other form of electronic message. A graphical representation of the graphical user interface of the wireless phone 200 as it appears after receiving acknowledgement of the receipt of the new image 250 is shown in FIG. 9*a*, and as it appears after receiving the error message is shown in FIG. 9*b*.

The system and method of this invention enables the user of the wireless phone 200 with the unique identifier to share images with multiple users. The user of the wireless phone 200 utilizing an image acquisitions device 230 can upload the acquired new image 250 to the users account at the service at the web site 70 and subsequently share the acquired new image 250 with multiple recipients. The user is not required to have access to a PC or similar device. The user is capable, through the system and method of this invention: of acquiring an image and sharing this image with multiple recipients.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

The data object can be any large data object such as digital audio files, large text files, or images. All of the above data object have reduced size versions.

The mobile device can be any device with computational, memory and wireless capabilities such as a wireless phone, a smart phone, a personal digital assistant (PDA) with wireless capability, a smart communication device or an intelligent digital camera with wireless capability The system can be enabled to transmit over a data network using protocols such as WAP, the DoCoMo I-mode protocol, or any subsequent standard and use a mark up language such as WML, c-HTML, XHTML or any subsequent standard for mark up languages.

It should be apparent that the web site 70 could be collocated in the remote server 50 and/or that more than one web sites could be accessed.

Any form of conversion from the reduced mark up language and protocol can be used and the conversion system, such as the WAP gateway or the I-mode center server, can be incorporated into the remote server 50. Any configuration that enables the information to flow between the remote server 50 and the mobile device 10 can be used.

Server 50, web site 70 and mobile device 10 (or wireless phone 200) have computational and data storage capabilities and utilize computer readable media that contains the instructions for the computational operations. Common forms of computer-readable media include, for example, a floppy disk, a flexible disk, hard disk, magnetic tape, or any other magnetic medium, a CDROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Networks 20, 30, 60, and 210 use electrical, electromagnetic or optical signals that carry digital data streams representing various types of information. The signals through the various networks and through router or modems 40, 41, 42, and 43 which carry the digital data to and from the mobile device 10 (or wireless phone 200), server 50 and web site 70 are exemplary forms of carrier waves transporting the information. Since mobile device 10 (or wireless phone 200), server 50 and web site 70 exchange digital data, which can include program code, mobile device 10 (or wireless phone 200), server 50 and web site 70 comprise an exemplary form of a computer controlled system. Other embodiments of the invention, including combinations, additions, variations and other modifications of the disclosed embodiments will be obvious to those skilled in the art and are within the scope of the following claims.

That which is claimed is:

1. A method for sharing user provided data objects utilizing a mobile device, said mobile device having a unique identifier and access to at least one of a plurality of services accessible at a remote server, comprising the steps of:
   (A) establishing a linking relationship between said unique identifier and an account at a service from the at least one of a plurality of services accessible at the remote server;
   (B) receiving, at the remote server, a request, from said mobile device having said unique identifier, for access to the service containing the account linked to said unique identifier, said service being accessible at the remote server;
   (C) transmitting, to the mobile device having said unique identifier, a response, said response providing access to a plurality of entities, said entities comprising a list of user provided data objects and a list of user designated addresses, said entities being associated with the account linked to said unique identifier;
   (D) receiving, at the remote server, from the mobile device having said unique identifier, a request, said request comprising an indication of a selected user provided data object and an indication of at least one of a plurality of user designated addresses and a request to send said indicated data objects to said indicated at least one of a plurality of addresses, said addresses being selected from said list of user designated addresses; and
   (E) sending, to said at least one of a plurality of user designated addresses, a transmission providing access to the selected user provided data object thereby enabling sharing of the selected user provided data object with selected user designated addressees.

2. The method of claim 1 further comprising the step of:
   (F) receiving, at the remote server, from the mobile device having said unique identifier, a user provided data object from a data object source, said data object being added to the list of user provided data objects.

3. The method of claim 2 further comprising the step of:
   (G) transmitting to the mobile device having said unique identifier, upon receiving the user provided data object from the data object source, a notification of the status of reception.

4. The method of claim 1 wherein in step (C) the access to the list of user provided data objects further comprises access to reduced size versions of said user provided data objects.

5. The method of claim 1 wherein in step (E) the transmission provides access to a reduced size version of the selected user provided data object.

6. The method of claim 1 wherein in steps (D) and (E) the at least one of a plurality of user designated addresses include the addresses of other mobile devices.

7. The method of claim 4 wherein in steps (D) and (E) the at least one of a plurality of user designated addresses include the addresses of other mobile devices.

8. The method of claim 1 wherein the user provided data objects are images.

9. The method of claim 5 wherein the user provided data objects are images.

10. The method of claim 9 further comprising the step of:
    processing the selected user provided data object, prior to step (E), to provide optimal perceivable image quality.

11. A system for sharing user provided data objects utilizing a mobile device, said mobile device having a unique identifier, said system providing access to at least one of a plurality of services and comprising:
    means for establishing a linking relationship between said unique identifier and an account at a service from the at least one of a plurality of services;
    means for receiving a request, from said mobile device having said unique identifier, for access to the service containing the account linked to said unique identifier;
    means for transmitting, to the mobile device having said unique identifier, a response to the request, said response providing access to a list of user provided data objects and a list of user designated addresses;
    means for receiving, at the remote server, from the mobile device having said unique identifier, indication of a selected user provided data object data object and indication of at least one of a plurality of user designated addresses, said addresses being selected from said list of user designated addresses; and
    means for sending, to said at least one of a plurality of user designated addresses, a transmission providing access to the selected user provided data object thereby enabling sharing of the selected user provided data object with selected user designated addressees.

12. The system of claim 11 further comprising:
    means for receiving, from the mobile device having said unique identifier, a user provided data object from a data object source, said data object being added to the list of user provided data objects.

13. The system of claim 12 further comprising:
means for transmitting to the mobile device having said unique identifier, upon receiving the user provided data object from the data object source, a notification of the status of reception.

14. The system of claim 11 wherein the means for transmitting a response to the request, said response also provides access to reduced size versions of the user provided data objects.

15. The system of claim 11 wherein the means for sending a transmission providing access to the selected data object also provides access to a reduced size version of the selected user provided data object.

16. The system of claim 11 wherein said user provided data objects are images and said system further includes means for processing the selected user provided images to provide optimal perceived image quality.

* * * * *